Dec. 1, 1953
E. S. TAMM
2,661,451
INSTANTLY REVERSING MOTOR
Filed Jan. 26, 1952
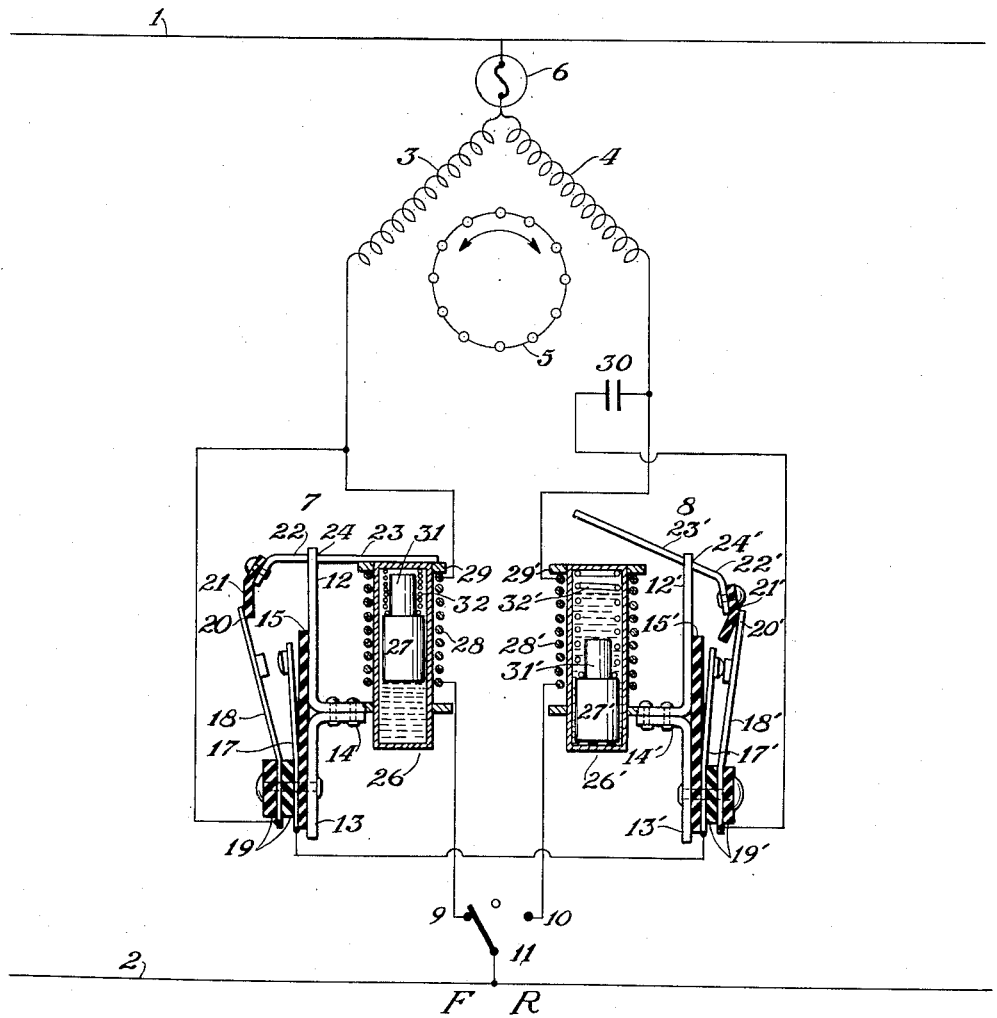
INVENTOR.
*Emil S. Tamm*
BY *Alfred T. Gross*
ATTORNEY.

Patented Dec. 1, 1953

2,661,451

UNITED STATES PATENT OFFICE 2,661,451

INSTANTLY REVERSING MOTOR

Emil S. Tamm, Plainfield, N. J., assignor to The Hoover Company, North Canton, Ohio, a corporation of Ohio Application January 26, 1952, Serial No. 268,406

7 Claims. (Cl. 318—207)

My present invention relates to the art of electric motors and particularly to a single phase, split phase start motor and control circuit therefor so arranged that the motor may be instantly reversed without requiring the use of speed responsive devices.

It is a more particular object of my invention to provide a single phase induction type capacitor start motor provided with a pair of equal main windings space displaced with reference to the induction rotor and each connected with a time delay current relay controlling a starting circuit including a condenser. The connections are so arranged that the control switch places one or the other of the main windings directly across the line with the other winding energized in series with the condenser until the motor is up to speed. Throwing the control switch reverses the relation of the two windings, placing the previous running winding in series with the condenser and the previous starting winding directly across the line in series with the associated current relay.

Referring now to the drawing, my motor and control circuit is illustrated schematically with the relays drawn to an enlarged scale.

In the drawing, the line wires 1 and 2 provide a single phase alternating current source of energy. The motor is provided with a pair of equal main windings 3 and 4 and an induction type rotor 5. The windings 3 and 4 are space displaced upon the usual stator structure so that their relation to the rotor will produce rotation in opposite directions when their immediate role as running and starting windings is reversed, in a manner to be described hereinafter.

The windings 3 and 4 are connected together at one end and are then connected through a fuse or other overload protective device 6 to the line 1. The other end of the motor main windings 3 and 4 are connected to the energizing coils of time delay relays 7 and 8, respectively. The coils of the time delay relays 7 and 8 are respectively connected to the contacts 9 and 10 which form running contacts of a single pole, three position switch 11, having the pole thereof connected to the line wire 2. The neutral position of the switch 11, between the contacts 9 and 10 is a de-energizing position for maintaining the motor non-operative when desired. It is apparent that the winding 3 and the coil of relay 7 are series connected across the line 1 and 2 when the switch is in the illustrated position which is labelled "F" for forward running. At this time, the winding 4 and coil of relay 8 are de-energized. If the switch is thrown to connect the swinging pole thereof to the contact 10, the winding 3 and coil of relay 7 are de-energized and the winding 4 and coil of relay 8 are then series connected across the lines 1 and 2.

The time delay relays 7 and 8 are of identical construction; hence only the relay 7 will be described herein in detail. The parts of the relay 8 will be given the same reference characters as the corresponding parts of relay 7 distinguished by the addition of a prime.

The time delay relay 7 comprises a pair of L-shaped brackets 12 and 13 riveted together at 14 to form a unitary assembly. The depending leg of the bracket 13 carries a plate 15 of insulating material upon which are mounted a pair of spring contacts 17 and 18 which are insulated from each other and the bracket 13 by the insulating blocks 19. The contacts 17 and 18 are biased to the normally closed circuit condition and the contact 18 is provided with a projecting section 20 adapted to engage a plate 21 of insulating material which is carried by a projecting and depending arm 22 of an armature 23 which is pivotally supported at 24 adjacent the upper end of the bracket 12. The armature overlies a tubular member 26 mounted in the horizontally extending leg of the bracket 12 and extending thereabove to a point just below the position of the armature 23 illustrated in the drawing. The tubular member 26 is a sealed element having a soft iron core 27 mounted therein to move freely relative to the walls of the tubular member 26. The space within the member 26 not occupied by the iron core 27 is filled with a liquid having substantially constant viscosity characteristics such as a liquid silicone oil. A coil 28 of heavy wire is wound about the exterior wall of the tube 26 and is connected to the winding 3 and switch contact 9. The upper end of the tubular member 26 carries a copper ring 29 in position to be engaged by the armature 23 and to form a short circuited coil to prevent chatter in the relay. Since the coil 28 is series connected with the motor winding and carries a heavy current, it comprises a small number of turns of heavy wire. The upper end of the core 27 has a reduced section 31 which is surrounded by a compression spring 32 bearing between the top of tube 26 and the shoulder on the core 27 at the base of the section 31.

In the operation of the foregoing relay, the core 27 will be close to the bottom of the tube 26 when the relay is de-energized as illustrated by the position of the core 27' of the relay 8. When the winding 28 is energized, the magnetic field thereof gradually lifts the core 27 against the resistance of the silicone oil and spring 32 until the core is in the top position illustrated for the relay 7. As the iron core approaches the topmost rest position thereof, the magnetic field of the system becomes sufficient to attract the armature 23 into the position shown of the relay 7, rocking the same clockwise, as viewed in the drawing, until the armature is in engagement with the ring 29 in which position the plate 21 has engaged the arm 20 and disengaged contacts 17 and 18. As long as the coil 28 is energized, the armature 23 is held in the position shown for the relay 7 against the force of the spring 32 and spring contact 18. As soon as the coil 28 is de-energized, the spring force of the contact 18 is sufficient to rock the armature 23 in a counter-clockwise direction away from the plate 29 and to move the contact 18 into engagement with contact 17 to close the circuit therebetween.

The time required between energization of coil 28 and the actuation of switch contacts 17 and 18 to open circuit position is determined by the clearance of the member 27 in the tube 26, the force of the spring 32 and the viscosity of the particular silicone oil charged in the tube 26. These factors permit a wide choice of relay time periods to suit particular cases. Such relays are capable of time delay of several minutes, if desired, though such extreme lengths are unnecessary for most motor applications.

The relay contacts 17 and 18 are series connected with the relay contact 17', 18' which in turn are serially connected to the starting condenser 30. The series circuit constituting the condenser 30 and relay contacts 17, 18, 17' and 18' is connected across the ends of the main winding 3 and 4 which are connected to the relay coils 28, 28'.

The operation of my motor is as follows: Assuming the pole of the switch 11 to be in the mid-position, the entire system will be de-energized and both relays will be in the condition illustrated by the relay 8 in the drawing. If now the pole of the switch 11 is thrown to running contact 9, winding 3 and coil 28 will be placed in series across the lines 1 and 2 and winding 28 will also be series connected from line 2 through the contacts of both relays and condenser 30 and through winding 4 to line 1. In these conditions, the winding 4 acts as a starting winding and energizes the motor to produce rotation of rotor 5 in the forward direction. The magnetic field of coil 28 gradually raises the core 27 to the position shown for the relay 7. As the core reaches top position, the magnetic field suddenly becomes strong enough to actuate the armature which then acts with a snap action to open the contacts 17 and 18, thus de-energizing the condenser 30 and the winding 4 after which the motor continues in the manner of an ordinary single phase induction motor with the winding 3 and the coil 28 series connected across the lines 1 and 2. If the pole of switch 11 is suddenly thrown from the contact 9 to the contact 10, winding 4 and relay coil 28' are placed directly across the line and winding 3 is series connected to the condenser 30 through the two pairs of relay contacts and coil 28' across the line. This places a powerful braking force upon the motor, quickly bringing the same to a standstill and then starts the motor in the reverse direction. The motor is brought up to approximately 70% synchronous speed before the core 27' has raised sufficiently in tube 26' to attract the armature 23' and open circuit the contacts 17' and 18' which will de-energize the condenser 30 and winding 3, after which the motor will continue to run in a reverse direction on winding 4.

The relays operate on a force which is the difference between the force of the spring contact and the magnetic pull on the armature; hence, the relay switch contacts reclose substantially instantaneously when the relay coil is de-energized as the force of the spring contact is sufficient to overcome the residual magnetism in the relay core. After the relay coil is de-energized, the weight of the core and the force of the core spring quickly returns the core to the bottom of the core tube to re-condition the relay for a new starting or reversing operation. When a relay is energized for starting or reversing operation, the coil of the active relay is energized by the full starting current of the motor which acts to create a magnetic field to lift the relay core against the core weight, force of the core spring and resistance of the oil in the core tube. The combined effect of the foregoing forces produces the desired delay between the energization of the relay coil and opening of the relay switch contacts. The quick return feature of the core is achieved because the combined effect of core weight and core spring force considerably overcomes the counter-acting oil resistance on de-energization of the relay coil.

The time period for the relays must be sufficient to brake the motor from full speed operation to a standstill and to bring the same up to approximately 70% synchronous speed when the reversing switch is actuated. As a result of this operation, the motor will remain in starting condition when directly energized from standstill for a short period after full running speed is obtained. This is not an objectional condition and does not overload the condenser as the condenser must be designed to withstand the more severe strain which is placed thereon at the instant of reversal.

If the previously open circuited pair of relay contacts, for some reason, fail to close by the time the pole of the reversing switch has been manipulated from one running contact to the other, the only result is a momentary complete de-energization of the previous running winding, direct energization of the previously inactive winding and a short delay before the previous running winding is placed in series with the condenser which then produces the braking force to bring the motor to a standstill and to start the same in operation in a reverse direction.

The foregoing motor and control system is characterized by highly satisfactory and absolute certainty of instantaneous reversal by the simple operation of throwing a reversing switch. Since the relays operate substantially instantaneously to return to closed circuit position when their energizing coils are deenergized, there is no dead period between actuation of the switch and the production of full braking effect.

While the invention has been illustrated and described in detail herein, it is not to be limited thereto but various changes may be made in the construction, design and arrangement of parts without departing from the spirit of the invention or the scope of the appended claims.

I claim:

1. An instantly reversing motor comprising a rotor, a pair of space displaced running windings having a common line connection at one end thereof; a pair of time delay current relays each including a normally closed switch, an energizing coil, a magnetically actuated armature for opening said switch positioned beyond the influence of the field of said coil, a magnetic core member normally positioned remotely from said armature and movable toward said armature under the influence of the field of said coil to actuate said armature and means retarding movement of said core toward said armature to interpose a time delay between energization of said coil and the opening of said switch; an impedance member connected through said switches across the free ends of said running windings, a reversing switch having a line connection and a pair of running contacts selectively connectible to said line connection, and means connecting the free end of each of said running windings to one of said running contacts through one of said energizing coils.

2. Apparatus according to claim 1 including spring means biasing said relay switches to closed position whereby each of said relay switches will close as soon as the associated relay coil is de-energized.

3. Apparatus according to claim 1 including spring means biasing said core member to said normal position.

4. An instantly reversible split phase induction motor comprising a rotor, a pair of main windings arranged in spaced phase relation to said rotor and having a common line connection at one end thereof, a pair of time delay current relays each having a normally closed switch and an energizing coil, a reversing switch having a line connecton and a pair of selectively energizable running contacts, means forming a pair of parallel circuits each comprising a series circuit from the free end of one of said running windings through one of said energizing coils to one of said running contacts, and means forming a series circuit consisting of said switches and an impedance element connected across the free ends of said running windings whereby either of said running windings may be energized for running operation by said reversing switch with the other of said windings energized serially through said switches and said impedance element until de-energized by one of said relays operating to open one of said switches.

5. An instantly reversible motor comprising a pair of main windings each having one end thereof connected to a supply line, a pair of time delay current relays each having an energizing coil connected to the other end of one of said main windings and a pair of normally closed switch contacts adapted to be opened in time delayed relation to the energization of the associated relay coil, a reversing switch having a pair of running contacts each connected to one of said relay coils and a pole connected to the other supply line and selectively connectible to said running contacts, and a condenser serially connected with said pairs of relay contacts across said other ends of said main windings.

6. An instantly reversible motor comprising an inductively energized rotor, a pair of main windings positioned relatively to said rotor to produce rotation thereof in opposite directions when either of said main windings is energized in series with a current de-phasing impedance, a pair of time delay current relays each including an energizing coil and a pair of normally closed switch contacts and means actuated in response to the energization of said coil for opening said switch contacts in time delayed relation to the energization of said energizing coil, said main windings being connected together at one end for connection to a power source and each having its other end connected to one of said energizing coils, means for selectively connecting said energizing coils to said power source, and a condenser serially connected to said switches across said other ends of said main windings.

7. An instantly reversible motor comprising a rotor, a pair of main windings having a line connection at one end thereof and arranged in energizing relation to said rotor and in spaced relation to each other, an impedance element, means establishing a starting circuit including said impedance element across the other ends of said main windings, a pair of electrically actuated means each operable in time delayed relation to the energization thereof to open said circuit across the ends of said main windings, and means including a reversing switch for selectively establishing a first circuit in which one of said main windings and one of said electrically actuated means are energized independently of said starting circuit or a second circuit in which the other of said main windings and the other of said electrically actuated means are energized independently of said starting circuit.

EMIL S. TAMM.

References Cited in the file of this patent
UNITED STATES PATENTS

| Number | Name | Date |
|---|---|---|
| 2,408,369 | Brongersma | Oct. 1, 1946 |
| 2,580,242 | Reek | Dec. 25, 1951 |